United States Patent
El Ghannam et al.

(10) Patent No.: US 10,927,766 B2
(45) Date of Patent: Feb. 23, 2021

(54) TURBOPROP COMPRISING A GAS GENERATOR AND AN ACCESSORY BOX COUPLED TO A REAR END OF A HIGH PRESSURE SHAFT OF THE GAS GENERATOR

(71) Applicant: SAFRAN AIRCRAFT ENGINES, Paris (FR)

(72) Inventors: Nora El Ghannam, Melun (FR); Geoffroy Marie Gerard Nicq, Thomery (FR); Mathieu Laurent Louis Perrier, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/347,300

(22) PCT Filed: Nov. 9, 2017

(86) PCT No.: PCT/FR2017/053057
§ 371 (c)(1),
(2) Date: May 3, 2019

(87) PCT Pub. No.: WO2018/087478
PCT Pub. Date: May 17, 2018

(65) Prior Publication Data
US 2019/0331028 A1 Oct. 31, 2019

(30) Foreign Application Priority Data

Nov. 10, 2016 (FR) ...................................... 16 60909

(51) Int. Cl.
*F02C 7/32* (2006.01)
*F02C 7/36* (2006.01)

(52) U.S. Cl.
CPC . *F02C 7/32* (2013.01); *F02C 7/36* (2013.01)

(58) Field of Classification Search
CPC ...... F02C 7/36; F02C 6/20; F02C 7/32; F02C 6/206
See application file for complete search history.

(56) References Cited

U.S. PATENT DOCUMENTS

| 3,025,025 A | 3/1962 | Duettmann |
| 8,701,381 B2 * | 4/2014 | Eames ................. B64C 11/346 60/39.163 |

(Continued)

FOREIGN PATENT DOCUMENTS

| EP | 2 774 852 A2 | 9/2014 |
| WO | WO 2012/004516 A1 | 1/2012 |

OTHER PUBLICATIONS

International Search Report dated Feb. 12, 2018 in PCT/FR2017/053057 filed Nov. 9, 2017.

(Continued)

*Primary Examiner* — Eldon T Brockman
(74) *Attorney, Agent, or Firm* — Oblon, McClelland, Maier & Neustadt, L.L.P.

(57) ABSTRACT

A turboprop including a propeller shaft and a gas generator running along this propeller shaft, this gas generator including a high-pressure shaft and a hollow low-pressure shaft both extending along the same longitudinal axis, the low-pressure shaft having a rear end coupled to a rear end of the propeller shaft via a reducer. It includes an accessory box contiguous to the reducer while being located facing a rear end of the low-pressure shaft, and coupled to the rear end of the high-pressure shaft by a shaft passing through the low-pressure shaft.

7 Claims, 2 Drawing Sheets

(56) References Cited

U.S. PATENT DOCUMENTS

| | | | |
|---|---|---|---|
| 2007/0240415 A1* | 10/2007 | Julien | F02C 3/055 |
| | | | 60/614 |
| 2012/0128487 A1* | 5/2012 | Eames | F01D 15/12 |
| | | | 416/1 |
| 2013/0098052 A1 | 4/2013 | Bedrine et al. | |
| 2014/0252159 A1 | 9/2014 | Stretton | |
| 2018/0223740 A1* | 8/2018 | Forest | F02C 7/268 |

OTHER PUBLICATIONS

French Preliminary Search Report dated Jul. 5, 2017 in French Application No. 16 60909 filed Nov. 10, 2016.

\* cited by examiner

TURBOPROP COMPRISING A GAS GENERATOR AND AN ACCESSORY BOX COUPLED TO A REAR END OF A HIGH PRESSURE SHAFT OF THE GAS GENERATOR

THE GAS GENERATOR

Technical Field

The invention relates to the integration of an accessory box to an offset shaft turboprop.

State of the Prior Art

A turboprop is an aircraft engine comprising an unducted propeller driven by a gas turbine called a gas generator, and the thrust of which is generated only by this propeller.

The invention relates to the integration, to an offset shaft turboprop, of an accessory box usually designated by the acronym AGB (Auxiliary Gera Box). Such an accessory box comprises at least one pinion gear line to drive additional accessories or pieces of equipment at rotational speeds adapted to each piece of equipment. These pieces of equipment typically comprise one or more oil and fuel pumps, a starter and an alternator.

In an offset shaft turboprop, such as the turboprop 1 of FIG. 1, the propeller shaft 2 extends along a longitudinal axis AX along the entire length of the turboprop, and the gas generator 3 extends parallel to the propeller shaft 2. The gas generator 3 contains a high-pressure rotary body 4 located in its front part and ending with a shaft called high-pressure shaft 6, as well as a low-pressure turbine body 7 located in its rear part and ending with a shaft called low-pressure shaft 8.

The low-pressure turbine 7 is independent in rotation from the high-pressure body 4, but they both rotate about the same axis AX' parallel to the axis AX of the propeller shaft. This low-pressure turbine 7, whose rotation speed is lower than the speed of the high-pressure body, is supplied with pressurized gas in the expansion phase coming from the high-pressure body 4.

The high-pressure body 4 and the low-pressure body 7 with their shafts rotate about the same axis AX' while being independent of one another. The set is surrounded by an outer shell 10 formed of casings and extending over most of the length of the gas generator.

A reducer 9 located at the rear of the turboprop is coupled, on the one hand, to the low-pressure shaft 8 that passes through a corresponding nozzle 11 and, on the other hand, to the rear end of the propeller shaft 2. The reducer 9 is thus located at the rear of the turboprop, i.e. at its end opposite to the front end that includes the propeller 12.

As seen in FIG. 1, the front end of the gas generator 3 is equipped with an air inlet sleeve 14, in the form of a wall of revolution formed by a casing or the like surrounding the high-pressure shaft. The accessory box, marked 16, is contiguous to the lower part of the shell of the gas generator and driven by the high-pressure shaft 6.

This driving is ensured by a radial shaft 17 perpendicular to the high-pressure propeller shaft 6 which is coupled to a front part of this shaft by two bevel pinions not shown in the figure. This radial shaft 17 passes through the wall of the air intake sleeve 14 in order to be coupled by its other end to the accessory box 16 by means of another coupling.

This other coupling is ensured by another angle transmission comprising two other bevel pinions to drive a main shaft 18 of the accessory box 16, which extends parallel to the high-pressure shaft 6 and to the propeller shaft 2.

With the architecture of FIG. 1, the maintenance of the accessory box is complicated by the fact that it is located in the lower part of the turboprop i.e. of a difficult accessibility, and that it is driven in rotation by two angle transmissions with bevel pinions making it voluminous and heavy.

The object of the invention is to provide a turboprop architecture in which the accessory box is integrated in a both compact and accessible manner.

PRESENTATION OF THE INVENTION

For this purpose, the invention relates to a turboprop comprising a propeller shaft and a gas generator running along this propeller shaft, this gas generator comprising a high-pressure shaft and a hollow low-pressure shaft both extending along the same longitudinal axis, the low-pressure shaft having a rear end coupled to a rear end of the propeller shaft via a reducer characterized in that it includes an accessory box contiguous to the reducer, and coupled to the rear end of the high-pressure shaft via a drive shaft passing through the low-pressure shaft.

The mounting of the accessory box attached to the rear of the reducer facilitates maintenance access to the accessory box and to the other turboprop components as well. This arrangement also makes it possible to reduce the overall turboprop section to optimize its aerodynamic line and its performance. In addition, the center of gravity of the engine is thus shifted backwards, which is beneficial as regards its attachment to the wing carrying it.

The invention also relates to a turboprop defined accordingly, wherein the accessory box is carried by the reducer.

The invention also relates to a turboprop defined accordingly, wherein the drive shaft passes through the reducer and part of the accessory box in order to be extractable from the rear of the turboprop.

The invention also relates to a turboprop defined accordingly, wherein the reducer includes a bearing carrying the accessory box drive shaft.

DETAILED PRESENTATION OF PARTICULAR EMBODIMENTS

The idea underlying the invention is to provide, within offset shaft turboprop architecture, mounting the accessory box at the rear of the reducer by coupling it to a rear end of the high-pressure shaft of the gas generator. In this configuration, the accessory box is easily accessible for a maintenance operation, while being integrated in a compact manner.

Figure 1:
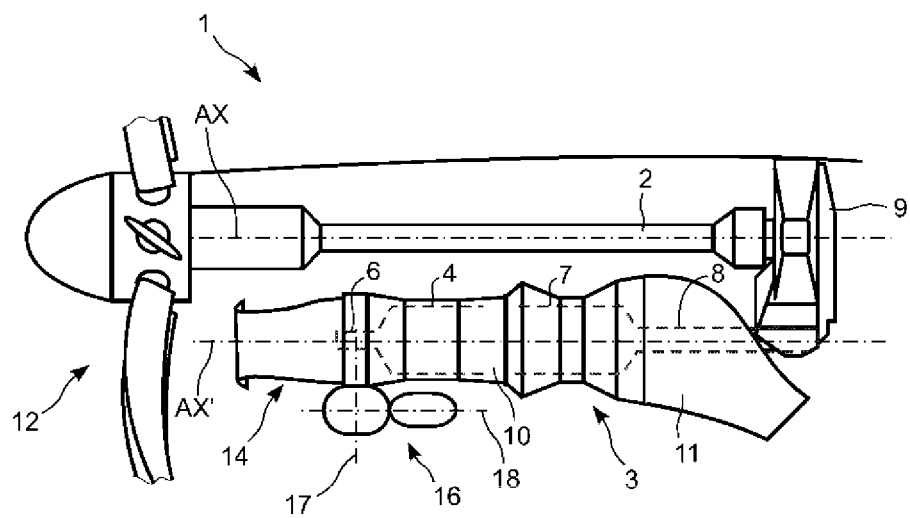
FIG. 1 already described is a side view of an offset shaft turboprop of the state of the art.
Figure 2:
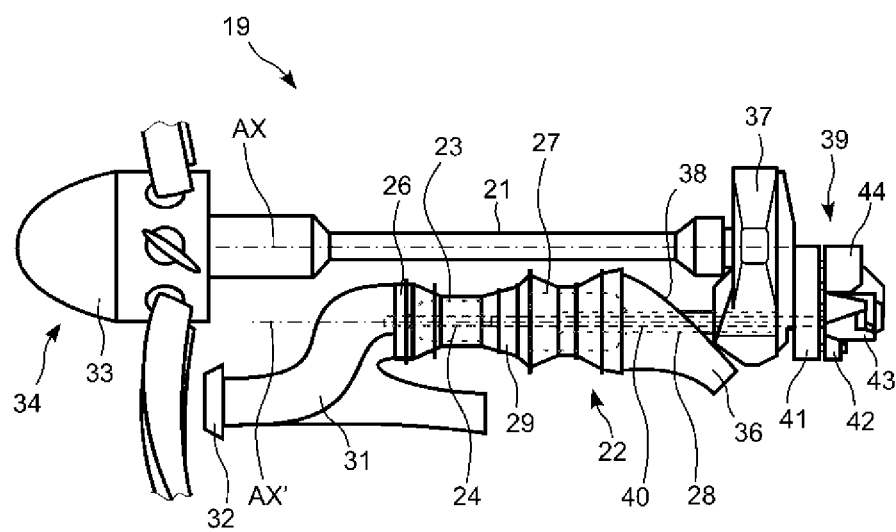
FIG. 2 is a side view of a turboprop according to the invention.

The offset shaft turboprop 19 shown in FIG. 2 includes a propeller shaft 21 extending along an axis AX, and a gas generator 22 running along this propeller shaft 21. As seen in FIG. 2, the gas generator 22 has a longitudinally extending shape and runs along the propeller shaft 21 while extending parallel thereto at a short distance therefrom. This gas generator 22 includes a high-pressure rotary body 23 located in its front part and ending with a shaft called high-pressure shaft 24, as well as a low-pressure body 27 located in its rear part and ending with a shaft called low-pressure shaft 28. The low-pressure body 27 which is independent in rotation of the high-pressure body 23 is supplied with pressurized gas in the expansion phase coming from the high-pressure body 23.

The high-pressure body 23 and the low-pressure body 27 with their shafts rotate about the same axis AX' while being independent of each other, and are located respectively at the front part and rear part of the gas generator. The set is surrounded by an outer shell 29 formed of casings and extending over most of the length of the gas generator.

The shell 29 is extended in the front part of the gas generator 22 by a curved air inlet duct 31, including an intake mouth 32 for collecting air in order to convey it in the inlet of the gas generator.

The mouth 32 is located under the hub 33 of the propeller 34 carried by the front end of the propeller shaft 21, to receive a sufficient air flow rate. The rear of the duct 31 is coupled to the inlet 26 of the shell 29, in order to supply the gas generator 22 with the air collected by the intake mouth 32.

The rear end of the low-pressure shaft 28 passes through the wall of an exhaust nozzle 36 which is connected to a downstream end of the shell 29, in order to be coupled to a reducer 37 to which the rear end of the propeller shaft 21 is also coupled.

The low-pressure shaft 28 thus drives in rotation the propeller 34 via the reducer 37, the propeller 34 rotating at a speed that is multiplied relative to the speed of the low-pressure shaft 28.

The low-pressure shaft 28 is a hollow shaft that passes through an opening formed in a downstream portion 38 of the wall of this nozzle, this opening forming a movement passage orifice for transmitting the movement of the shaft 28 to the reducer 37 in order to drive the propeller.

An accessory box 39 is coupled to the high-pressure shaft 24 by an additional drive shaft 40, one end of which is coupled to a mechanism of the accessory box 39 in order to drive it in rotation. This drive shaft 40 passes through the reducer 37 as well as through the hollow low-pressure shaft 28 and the low-pressure body 27, in order to be coupled to a rear end of the high-pressure shaft 24. This accessory box 39 is thus located facing a rear end of the low-pressure shaft 28.

The reducer 37 advantageously include at its rear wall 47 which is traversed by the drive shaft, a bearing supporting the drive shaft not shown in the drawings.

The accessory box 39 drive shaft passes through the entire thickness of the reducer 37 to extend within the low-pressure shaft 28 in order to be coupled to a rear end of the high-pressure shaft 24. Advantageously, this drive shaft can be extracted from the rear of the turboprop, through the reducer and the accessory box.

Thus, and as seen in FIG. 2, the rear portion of the turboprop includes, successively in the longitudinal direction of the axes AX and AX', the exhaust nozzle 36, the reducer 37 and the accessory box 39.

The accessory box 39 is thus directly coupled in line on the axis AX' of the high-pressure and low-pressure shafts behind the turboprop, i.e., it is located at the rear end of the turboprop.

This accessory box 39 which is coupled to the high-pressure shaft 24 includes a casing 41 forming a frame, which contains a line of pinions, and which carries a set of elements 42, 43, 44 also called pieces of equipments or accessories. These accessories include for example one or more oil and fuel pump(s), an alternator and possibly a starter for driving the high-pressure shaft 24 when the engine is to be started. These various elements 42, 43, 44 are driven in rotation at different speeds by the pinion assembly.

Figure 3:
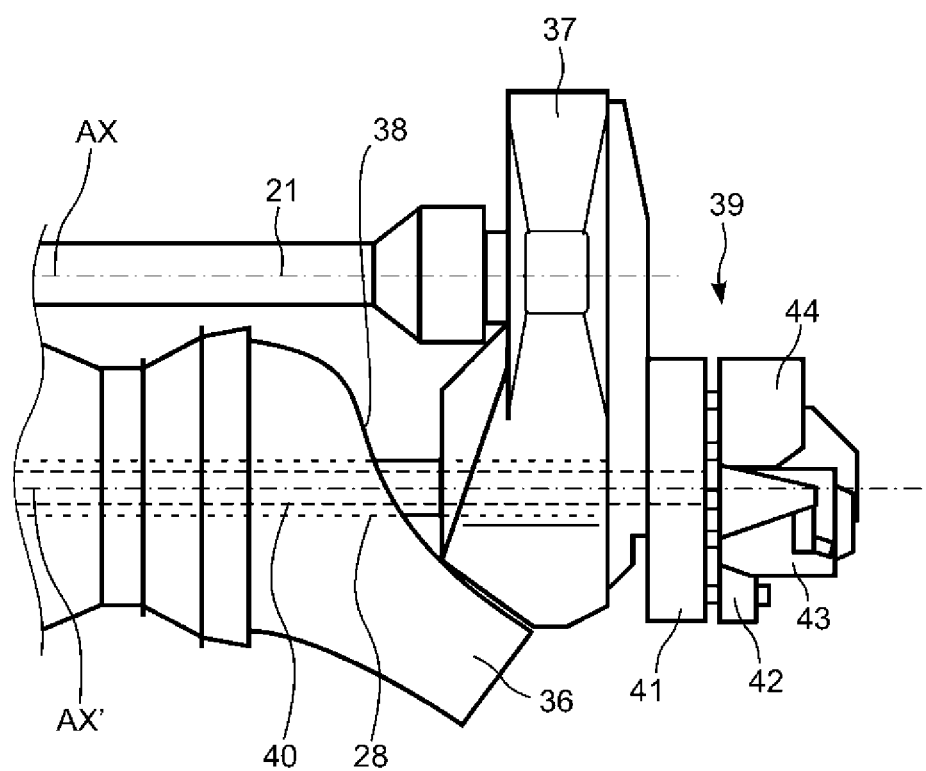
FIG. 3 is a detail side view of the integration of the accessory box according to the invention.

As seen more clearly in FIG. 3, the accessory box 39 is carried by the reducer 37 while being here attached to a rear face 47 of this reducer, this rear face extending substantially perpendicularly to the axis AX of the propeller. Furthermore, the drive shaft 40 advantageously passes through the reducer 37 and possibly part of the accessory box 39 in order to be extractable from the rear of the turboprop.

The invention claimed is:

1. A turboprop comprising a propeller shaft and a gas generator running along said propeller shaft, said gas generator comprising a high-pressure shaft and a hollow low-pressure shaft both extending along the same longitudinal axis, the low-pressure shaft having a rear end coupled to a rear end of the propeller shaft via a reducer wherein said turboprop further comprises an accessory box contiguous to the reducer, and coupled to the rear end of the high-pressure shaft via a drive shaft passing through the low-pressure shaft.

2. The turboprop according to claim 1, wherein the accessory box is carried by the reducer.

3. The turboprop according to claim 1, wherein the drive shaft is extractable from the rear of the turboprop.

4. The turboprop according to claim 3, wherein the reducer comprises a bearing carrying the accessory box drive shaft.

5. The turboprop according to claim 1, wherein said drive shaft drives the accessory box in rotation.

6. The turboprop according to claim 5, wherein the drive shaft passes through the reducer.

7. The turboprop according to claim 6, wherein the turboprop includes, successively in the longitudinal axis, an exhaust nozzle, the reducer and the accessory box.

\* \* \* \* \*